United States Patent [19]

Massaro

[11] 4,020,619

[45] May 3, 1977

[54] FULL SELF-PROPELLED LAWN MOWER

[76] Inventor: Joseph Massaro, 815 Canterbury Hill, San Antonio, Tex. 78209

[22] Filed: Dec. 8, 1975

[21] Appl. No.: 638,497

[52] U.S. Cl. .............................. 56/11.2; 180/19 H; 180/74

[51] Int. Cl.² ........................................ A01D 69/00

[58] Field of Search ............... 180/19 R, 19 H, 74; 56/11.2, 10.8, 10.1

[56] References Cited

UNITED STATES PATENTS

| 2,604,747 | 7/1952 | Bash | 180/74 X |
|---|---|---|---|
| 3,375,645 | 4/1968 | Miller | 180/19 R |
| 3,763,945 | 10/1973 | Danielson | 180/74 X |

Primary Examiner—Joseph F. Peters, Jr.
Assistant Examiner—John A. Pekar
Attorney, Agent, or Firm—Fred Philpitt

[57] ABSTRACT

A lawn mower propulsion system which is supported between the rear wheels and is pivotally mounted on the body by means of a pivot bolts, a forward driven shaft and a reverse driven shaft are rotatably mounted in the support, parallel to and on either side of the pivot bolts, friction rollers are fixedly mounted on the ends of the driven shafts to contact the rear wheels, the forward-drive rollers being larger than the reverse-drive rollers, pulleys are fixedly mounted on the driven shafts, a pair of pulleys is mounted on the offset drive shaft, a belt connects each of the pulleys on the offset drive shaft to a pulley on one of the driven shafts and are mounted to drive the rearmost driven shaft and the rear wheels in the forward direction and the forwardmost driven shaft and the rear wheels in the reverse direction, springs, connected to the support and the body, normally urge the forward-drive into contact with the rear wheels, the mower handle pivots downwardly against the support to pivot the forward-drive away from the rear wheels to a non-driving position and then pivot the reverse-drive into contact with the rear wheels, a forward-drive control, pivotally mounted on the handle, holds the forward-drive in the non-driving position, a reverse-drive control is pivotally mounted on the handle, and a pair of front wheels are mounted to freely pivot on the body.

32 Claims, 4 Drawing Figures

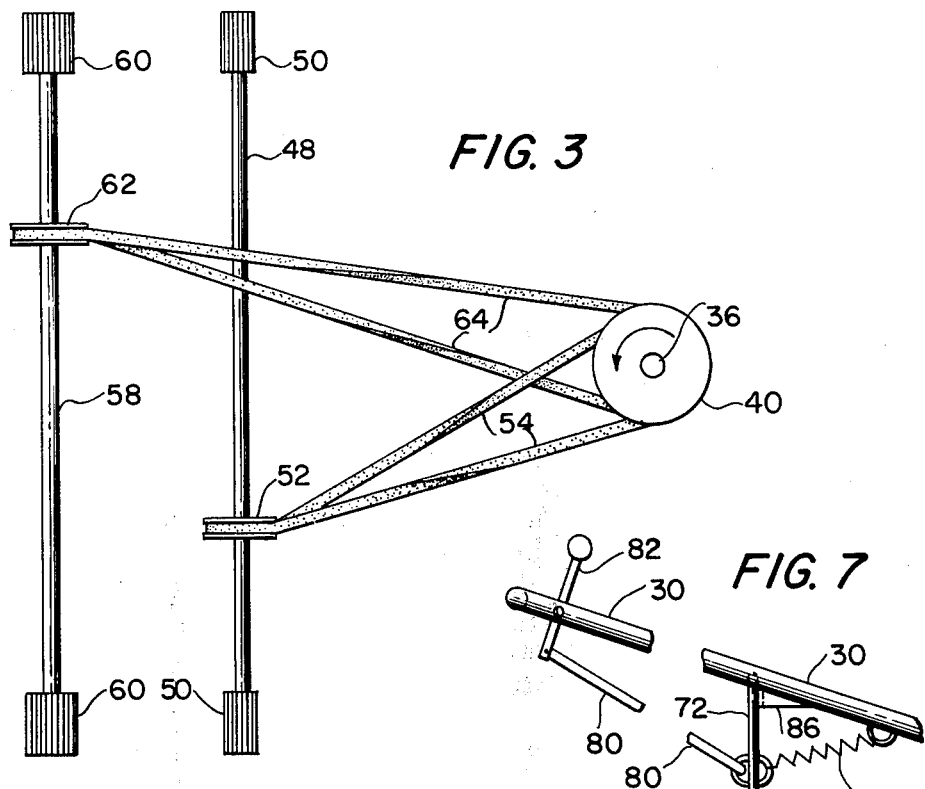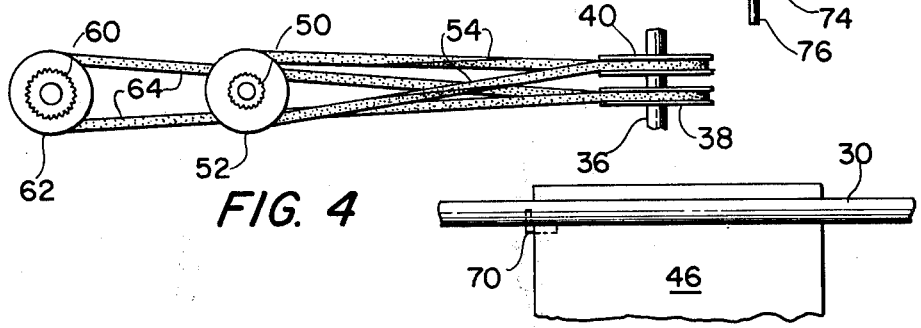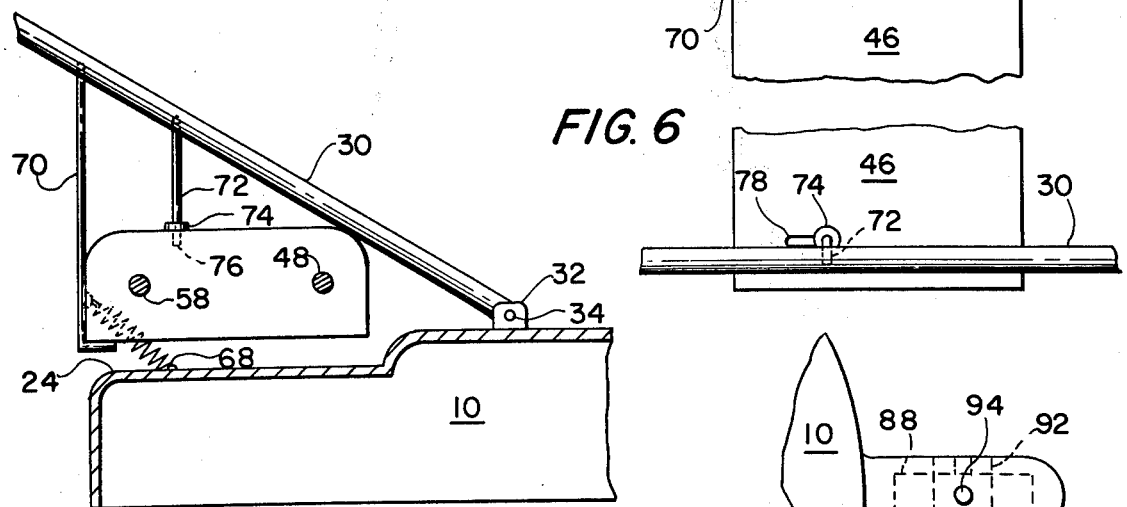

FULL SELF-PROPELLED LAWN MOWER

BACKGROUND OF THE INVENTION

The present invention relates to a self-propelled lawn mower. In a more specific aspect, the present invention relates to a self-propelled lawn mower capable of propulsion in both forward and reverse modes of operation. In still another aspect, the present invention relates to a forward and reverse propulsion system which may be readily incorporated in a standard lawn mower as an original option or added, as a modification, to an existing conventional lawn mower.

In the prior art, numerous propulsion systems have been devised and a large number of these have been and are being commercially produced.

One such system involves the utilization of a gear box or transmission containing appropriate toothed or friction gears. There are obvious disadvantages to such systems. First and foremost is the cost of such a system, which is generally so high that the inclusion thereof on a conventional, homeowner's mower cannot be economically justified, even when the transmission is designed for simple forward propulsion. Secondly, such transmissions add one more item to malfunction or fall into disrepair and which cannot be repaired by the ordinary homeowner or mechanic. This is not a rare occurrance when one recognizes that such transmissions are usually designed and manufactured with an eye to economy rather than durability. Further, the very nature of such systems requires that they be incorporated in a mower specifically constructed for transmission drive and at the factory. Hence, they cannot be installed on existing mowers or mowers designed to be hand-propelled.

Another common type of propulsion system is one in which a pair of friction rollers are engaged with either the front or rear wheels of the mower. This is generally accomplished by fixedly mounting the friction rollers on the ends of a driven rod or axle and actuating a control mechanism of some type to bring the friction rollers into contact with the driven wheels of the mower. This arrangement has a number of advantages over the transmission-operated system. The friction roller-driven wheel arrangement is, of course, more economical. Secondly, it can be factory installed on standard design mowers and in most cases can be added to an existing commercially available mower. However, Applicant is aware of no friction roller-driven wheel system which is adapted to be propelled in reverse in addition to forward.

The transmission-operated system can, of course, be propelled in both the forward or reverse modes, and sometimes is. However, the addition of a reverse drive mode simply doubles the problems, of this type system, which were previously pointed out. In addition, there is normally no means to prevent the system from being accidentally put in reverse. This is a consideration of no small moment, when one recognizes the number of accidents which are normally attributable to conventional mower operation, without reverse propulsion. Further, such systems are generally operated by a simple lever which can easily be accidentally bumped and put in reverse drive or can be readily put in reverse drive simply by someone forgetting which direction to move the lever, as a result of the usual, occasional periods of use of the mower.

It is, therefore, an object of the present invention to provide an improved self-propelled lawn mower. Another object of the present invention is to provide an improved self-propelled mower operable in either the forward or reverse mode. Yet another object of the present invention is to provide an improved self-propelled mower which is simple, economical and safe. Another and further object of the present invention is to provide an improved propulsion system for a mower which can be readily added to a standard design mower, of the rotary- or reel-type, either at the factory or by the owner. Another object of the present invention is to provide an improved mower, having both forward and reverse modes of propulsion, which cannot be accidentally or inadvertantly put into the reverse drive mode. A still further object of the present invention is to provide an improved mower having both forward and reverse modes of propulsion and in which the reverse mode of propulsion operates at a lower speed than the forward propulsion. Another object of the present invention is to provide an improved mower which can be shifted from the forward to the reverse modes of propulsion quickly.

SUMMARY OF THE INVENTION

In a lawn mower having body means, front and rear transport wheels operatively mounted on said body means, cutter means operatively mounted on said body means, motor means operatively connected to said cutter means to drive said cutter means, forward-drive friction roller means operatively connected to said motor means to be driven by said motor means and pivotally mounted on said body means to pivot into frictional engagement with either the top front or top back of the rear transport wheels to propel said mower in a forward direction, and control means for engaging said friction roller means with said one of said top front and top rear of rear transport wheels, the improvement comprising a reverse propulsion conversion system for addition to said mower for propelling said mower in a reverse direction, including; reverse-drive friction roller means operatively connected to said motor means to be driven by said motor means and pivotally mounted on said body means to pivot into frictional engagement with either the front or top of the rear transport wheels to propel said mower in a reverse direction and control means for engaging said friction roller means with said top front or top back of the rear transport wheels. To the extent that the mower is not provided with a forward-drive means, the forward-drive means as described is combined with the reverse-drive means and mounted as an optional factory installation or by the owner.

BRIEF DESCRIPTION OF THE DRAWINGS

Tha above-mentioned and other objects and advantages of the present invention will be apparent from the description which follows when read in conjunction with the drawings wherein:

FIG. 3 is a plan view of the propulsion system of the present invention, FIG. 4 is a side, elevational view of the propulsion system of FIG. 3, FIG. 5 is a cross-sectional view taken along the line 5—5 of FIG. 1, FIG. 6 is a plan view of a portion of the mechanism shown in FIG. 5, FIG. 7 is a plan view of a modified form of the mechanism shown in FIGS. 5 and 6, and FIG. 8 is a plan view, of a front portion of the mower of FIG. 1 showing a modification thereof.

DESCRIPTION OF THE PREFERRED EMBODIMENTS

Figure 1:
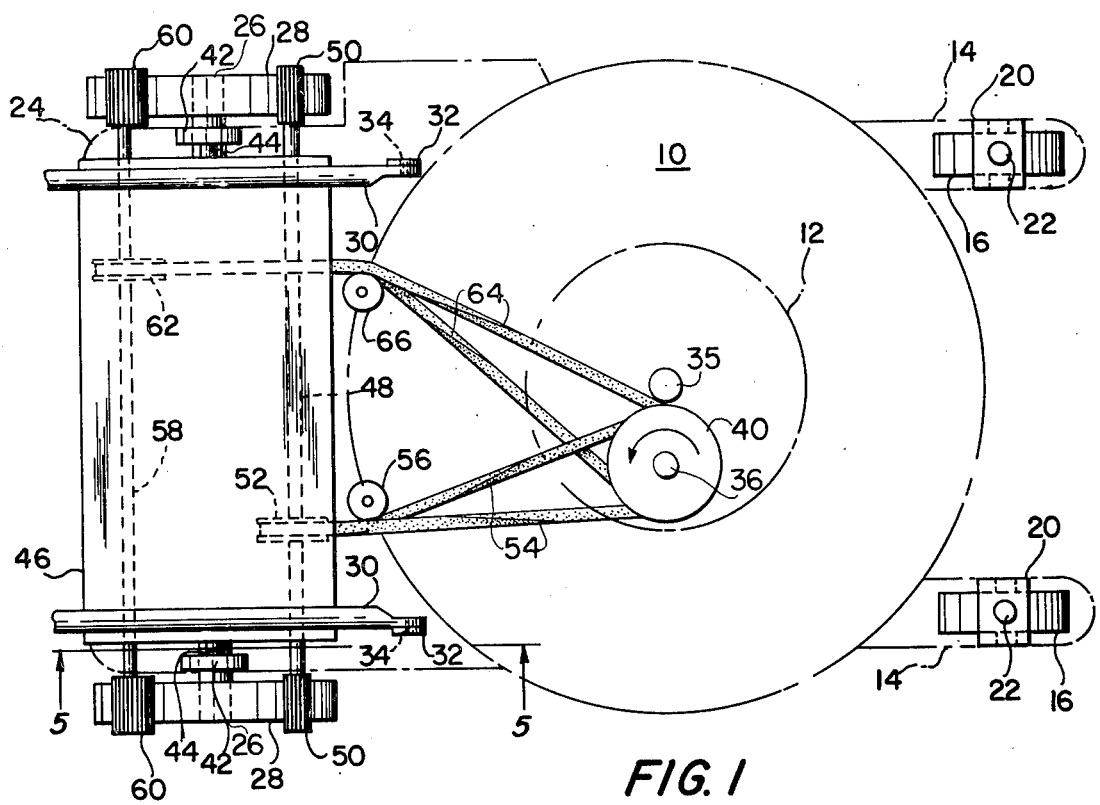
FIG. 1 is a plan view of a mower in accordance with the present invention, with certain standard portion thereof shown in phantom.
Figure 2:
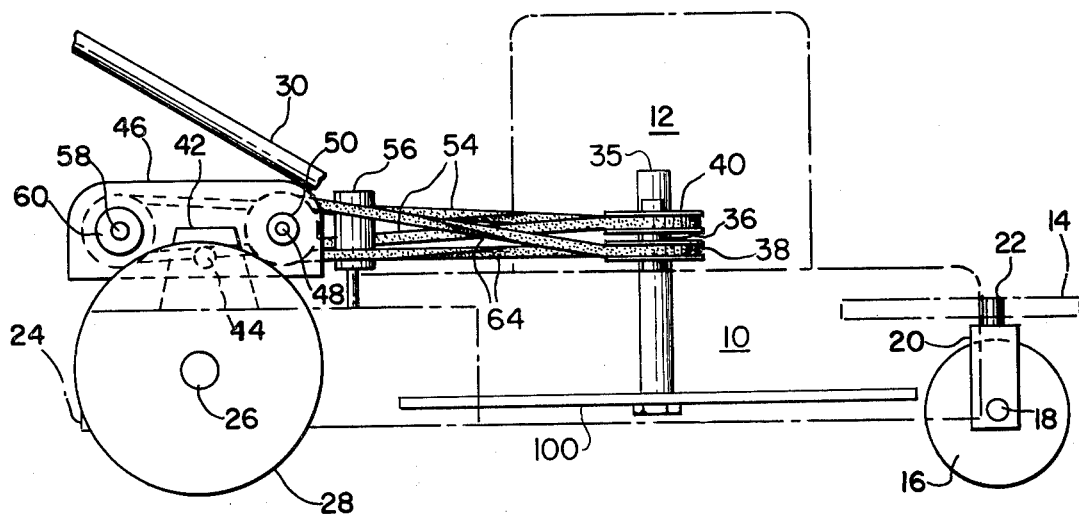
FIG. 2 is a side, elevational view of the mower of FIG. 1.

FIGS. 1 and 2 of the drawings show the overall structure of a lawnmower incorporating the invention of the present application.

In accordance with FIGS. 1 and 2, mower housing 10 is shown in phantom. Also shown in phantom is motor 12 for driving a rotary blade 100 and the offset drive of the forward and reverse propulsion system of the present invention. Pivotally mounted on extensions 14 at the front of housing 10 are front wheels 16. Wheels 16 are free to turn on axles 18, which are mounted in U-shaped brackets 20. Caster-type wheels may also be utilized as the front wheels. Fixedly attached to the top of brackets 20 are pivot pins 22, which, in turn, are mounted to freely pivot in extensions 14. Mounted in rear deck 24 of housing 10 are bolt axles 26. Bolt Axles 26 rotatably support rear wheels 28. Operating handle 30 is mounted on housing 10 by means of upstanding flanges 32 and pivot pins 34. Offset Drive shaft 36 carries pulleys 38 and 40, respectively. Pulleys 38 and 40 are both rotated by offset drive shaft 36 in the direction indicated by the arrow in FIG. 1. As will be explained in greater detail hereinafter, pulley 40 drives the rearward or reverse propulsion mechanism while pulley 38 drives the forward propulsion mechanism.

Attached to rear deck 24 of housing 10 are upstanding flanges 42. Extending across close to the outer edges of the rear deck 24 and mounted in flanges 42 are pivot bolts 44. Pivotally mounted on Pivot rod Bolts 44 is support platform or housing 46. Housing 46 may be pivotally mounted on flanges 42 by means of a pair of pivot bolts of pins rather than rod 44. Rotatably mounted in housing 46 adjacent the front thereof is reverse propulsion or drive rod 48. Fixedly attached to the ends of drive rod 48 are friction rollers 50. Fixedly mounted at an intermediate point on drive rod 48 is pulley 52. Continuous drive belt 54 passes about pulleys 40 and 52. As shown by the arrows in FIG. 1, belt 54 passes from the upper side of pulley 40, underneath pulley 52, about pulley 52, over the top of pulley 52 and thence about the lower side of pulley 40, thus driving pulley 52 and friction rollers 50 in a clockwise direction, as indicated by the arrow in FIG. 2. Accordingly, when friction rollers 50 are in contact with rear wheels 28, the rear wheels 28 and, hence, the mower will be propelled in the reverse direction. In order to reduce wear on belt 54, the belt may pass about idler roller 56, mounted on housing 10. Pivotally mounted in housing 46 adjacent the rear thereof is forward drive rod 58. Fixedly attached to the ends of drive rod 58 are friction rollers 60. Fixedly mounted on drive rod 58, at an intermediate location along the rod, is pulley 62. Passing about pulleys 38 and 62 is continuous drive belt 64. Referring to the arrows in FIG. 1, belt 64 passes from the upper side of pulley 38, over the top of pulley 62, about pulley 62, from the bottom of pulley 62 and thence to the lower side of pulley 38, to thereby drive pulley 62 and friction rollers 60 in a counter-clockwise direction as indicated by the arrow in FIG. 2. Therefore, when friction rollers 60 are in contact with rear wheels 28, the wheels 28 and the mower will be propelled forward. Belt 64 may pass about idler roller 66, mounted on housing 10. It should be noted at this point that idlers 56 and 66 are not necessary or may be replaced by appropriate idler pulleys. It should also be noted that friction rollers 60 are larger than friction rollers 50, so as to drive the mower at a forward speed faster than the reverse speed. Preferably, the forward speed is about twice the reverse speed.

FIGS. 3 and 4 show the forward and reverse propulsion mechanism of the present invention with the support platform or housing 46 removed.

FIGS. 5 and 6 illustrate control mechanisms for operating the forward and reverse propulsion mechanism. FIG. 5 shows tension springs 68 attached to rear deck 24 and housing 46, respectively, adjacent each end thereof. It can be seen, from this arrangement, that the rearward portion of housing 46 is normally pivoted downwardly about pivot bolts 44 by means of springs 68. When the housing 46 is pivoted down at the rear, it carries with it drive rod 58 and friction rollers 60. Friction rollers 60 contact rear wheels 28 to drive these wheels and propel the mower in the forward direction. When it is desired to place the propulsion mechanism in neutral, the operator simply presses down on handle 30 to push the front portion of housing 46 downwardly, overcome the resistance of springs 68 and raise the rearward portion of housing 46 so that the housing is in an essentially horizontal plane. Then control rod 70, which is swingably mounted on one side of handle 30, is hooked under the rear edge of housing 46, to hold the housing in this position, with friction rollers 60 out of contact with rear wheels 28. Under normal circumstances, this should maintain the propulsion system in neutral, but, since the forward portion of housing 46 can be pushed down by pushing downwardly on handle 30, to thus pivot friction rollers 50 into driving contact with rear wheels 28 and drive the mower in the reverse direction, some means is needed to prevent the accidental engagement of the reverse drive rollers 50 with the rear wheels 28 and the accidental propulsion of the mower in reverse. This is accomplished by control rod 72. Control rod 72 is swingably mounted in one side of handle 30 and carries collar 74 adjacent its lower end. The free, lower end 76 of rod 72 passes through a slot 78 in housing 46. Slot 78 is substantially equal in width to the diameter of the lower end 76 of rod 72, so that end 76 will pass therethrough but collar 74 will not. Slot 78 also extends rearwardly from a point directly below the normal, vertical position of rod 72 to a point such that the lower end 76 of rod 72 will swing rearwardly through the slot 78 when control rod 70 is released and the rearward portion of housing 46 is in its lowermost position with friction rollers 60 in contact with rear wheels 28. Hence, control rod 72 cannot be released through slot 78 when control rod 70 is in the latched position (the neutral position) shown in FIG. 5 and the mower cannot be put in reverse since the collar 74 stops housing 46 from being pivoted to the reverse drive position. Likewise, when control rod 70 is released, spring 68 will pivot the rearward portion of housing 46 downwardly to engage drive rollers 60 with wheels 28 and drive the mower forward, but, due to gravity, rod 72 will remain in a substantially vertical position ready to enter slot 78 and will do so if handle 30 is pressed downward to pivot the rear end of housing 46 upwardly and disengage forward drive rollers 60. When lower end 76 of rod 72 has thus automatically dropped into slot 78, pivoting of the housing 46 beyond the horizontal, neutral position and into the reverse drive position is prevented by collar 74. Accordingly, any accidental placing of the mower in the reverse drive mode is automatically prevented. In order to put the mower in reverse, control rod 70 must be released and, when the rear portion of housing 46 has moved downwardly a sufficient amount for end 76 of rod 72 to swing through slot 78, the control rod 72 is pivoted upwardly and rearwardly so that housing 46 can be pivoted to the reverse drive position by pressing downwardly on handle 30. Thus, only when both control rod 70 and control rod 72 are released can the mower be driven in reverse.

The above has shown and described the most simple, yet effective, means of controlling the propulsion of the mower, but it is obvious that other control systems may be substituted. For example, suitable lever and rod combinations may be attached to control rods 70 and 72 to bring the controls within convenient reach of the operator. However, in utilizing such extensions of the controls, it is highly desirable that the automatic operation of control rod 72 be assured. One such system is shown in FIG. 7. In accordance with FIG. 7, an extension rod 80 is attached at one end to rod 72 and is pivotally attached to control lever 82 at the other end. Lever 82 is pivotally mounted, at an intermediate point thereof, to handle 30. Hence, moving lever 82 downwardly will pull rod 80 upwardly and pivot rod 72 rearwardly and upwardly. However, to maintain automatic operation of rod 72, spring 84 is attached to rod 72 and handle 30 to normally pivot rod 72 forwardly. Accordingly, unless lever 82 is pushed forward and held, spring 84 will always automatically pull rod 72 forward. In order to prevent rod 72 from moving forward beyond a substantially vertical position, stop 86 is mounted on handle 30.

FIG. 8 of the drawings shows an alternate mower structure in which a single front wheel 88 is mounted on housing 10. Wheel 88 rotates on axle 90 and axle 90 is mounted in U-shaped bracket 92. Mounted on top of bracket 92 is pivot pin 94. Pivot pin 94 is pivotally mounted in support extension 96 which, in turn, is attached to housing 10.

It is thus apparent from the detailed description, appearing above, that a simple, positive-acting and safe means of propelling a mower in the forward or reverse direction is provided. In addition, the propulsion means can be readily and economically added to a standard, hand-operated mower either at the factory or by the owner. The drive mechanism also includes significant safety features. So long as the reverse drive control mechanism (control rod 72, etc.) is not deliberately released by the operator, the mower will not be driven in reverse, but, at worst, would be driven forwardly. Thus, by maintaining the reverse control engaged greater safety and control of the mower on a terrace is accomplished. Further, the reverse drive control is designed so that it cannot be released unless the forward drive control (70, etc.) is also released. In addition, the reverse drive control is also designed so that it will automatically engage and prevent the mower from being driven rearwardly unless this control is released and held in the released position. It is also to be noted that the system is designed so that the reverse drive speed is substantially slower than the forward drive speed, thus further contributing to the safety of the system. It should further be noted that the freely pivoting front wheel or wheels make it possible to turn the mower simply by moving the handle to the right or the left. As a result, it is not necessary to raise the front end to turn the mower and all wheels are in contact with the ground at all times thus permitting the operator better control over the mower. The stopping and starting of the forward drive is also quite simple. When the forward control (70 etc.) is released, the mower will be driven forward by simply releasing the handle of the mower so that it is moved upwardly by the housing 46 and springs 68 acting on the housing. However, the forward drive can be stopped immediately and simply by pressing the handle down.

While specific alternate constructions and modifications have been described and illustrated herein, it is obvious that other alternate constructions and modifications can be made by one skilled in the art without departing from the present invention. Accordingly, the present invention is to be limited only in accordance with the appended claims.

I claim:

1. In a lawn mower having body means, front and rear transport wheels operatively mounted on said body means, cutter means operatively mounted on said body means and motor means operatively coupled to said cutter means to drive said cutter means, the improvement comprising: forward-drive friction roller means operatively coupled to said motor means and driven by said motor means and pivotally mounted on said body means to pivot into frictional engagement with either the top front or top back of the rear transport wheels and drive said mower in a forward direction; forward-drive control means operatively engageable with said forward-drive friction roller means to hold said forward-drive friction roller means out of frictional engagement with said driven transport wheel; forward-drive engaging means to pivot said forward-drive friction roller means into frictional engagement with said driven transport wheel; reverse-drive friction roller means operatively coupled to said motor means and driven by said motor means and pivotally mounted on said body means to pivot into frictional engagement with said driven transport wheel and drive said mower in reverse direction; reverse-drive control means operatively engageable with said reverse-drive friction roller means to hold said reverse-drive friction roller means out of frictional engagement with said driven transport wheel; and reverse-drive engaging means to pivot said reverse-drive friction roller means into frictional engagement with said driven transport wheel, gear means for driving the forward-drive friction roller means and the reverse-drive friction roller means at the same speed by the motor means and the forward-drive friction roller means has a friction roller larger than a corresponding friction roller of the reverse-drive friction roller means, whereby the mower will be driven in a forward direction faster than it can be driven in a reverse direction.

2. A mower in accordance with claim 1 wherein the driven transport wheel means is a pair of rear transport wheels and the forward-drive friction roller means and the reverse-drive friction roller means are frictionally engageable with said pair of rear transport wheels and at least one front transport wheel is freely pivotable on a substantially vertical axis.

3. A mower in accordance with claim 2 wherein a pair of front transport wheels are freely pivotable on substantially vertical axes.

4. A mower in accordance with claim 1 wherein the reverse-drive engaging means includes a mower operating handle means pivotally mounted on the body means to pivot into engagement with the reverse-drive friction roller means and pivot said reverse-drive friction roller means into frictional engagement with the driven transport wheel.

5. A mower in accordance with claim 4 wherein the forward-drive engaging means includes a spring means normally urging the forward-drive friction roller means into frictional engagement with the driven transport wheel, said forward-drive friction roller means and the reverse-drive friction roller means are coupled together to pivot together and form a drive assembly and the operating handle means is pivotable in one direction into engagement with said drive assembly to first overcome the tension of said spring means and pivot said forward-drive friction roller means out of contact with said driven transport wheel and to a non-driving position and, thereafter, to pivot said reverse-drive friction roller means into engagement with said driven transport wheel.

6. A mower according to claim 1 wherein said front transport wheels are mounted so as to pivot about a vertical axis.

7. In a lawn mower having body means, front and rear transport wheels operatively mounted on said body means, cutter means operatively mounted on said body means and motor means operatively coupled to said cutter means to drive said cutter means, the improvement comprising: forward-drive friction roller means operatively coupled to said motor means and driven by said motor means and pivotally mounted on said body means to pivot into frictional engagement with either the top front or top back of the rear transport wheels and drive said mower in a forward direction; forward-drive control means operatively engageable with said forward-drive friction roller means to hold said forward-drive friction roller means out of frictional engagement with said driven transport wheel; forward-drive engaging means to pivot said forward-drive friction roller means into frictional engagement with said driven transport wheel; reverse-drive friction roller means operatively coupled to said motor means and driven by said motor means and pivotally mounted on said body means to pivot into frictional engagement with said driven transport wheel and drive said mower in a reverse direction; reverse-drive control means operatively engageable with said reverse-drive friction roller means to hold said reverse-drive friction roller means out of frictional engagement with said driven transport wheel; and reverse-drive engaging means to pivot said reverse-drive friction roller means into frictional engagement with said driven transport wheel wherein the forward-drive friction roller means and the reverse-drive friction roller means are coupled together to pivot together and form a drive assembly.

8. A mower in accordance with claim 7 wherein the drive assembly is pivotally mounted on the body means and the forward-drive friction roller means and the reverse-drive friction roller means are mounted on separate sides of the pivot axis of said drive assembly.

9. A mower in accordance with claim 8 wherein the driven transport wheel includes a pair of driven transport wheels mounted on either side of the body means, the drive assembly includes pivot support means between said pair of wheels and each of the forward-drive friction roller means and reverse-drive friction roller means comprises a driven shaft rotatably mounted in said support means and a pair of friction rollers fixedly mounted on the ends of said driven shaft to contact said pair of driven transport wheels.

10. A mower in accordance with claim 9 wherein a first pulley means is fixedly mounted at an intermediate point along the length of the driven shaft of the forward-drive friction roller means, the cutter means is operatively coupled to the motor means by a power offset drive shaft, a second pulley means is fixedly mounted on said power offset drive shaft, a first endless, flexible power transfer means operatively connects said first and said second pulley means, a third pulley means is fixedly mounted at an intermediate point along the length of the driven shaft of the reverse-drive friction roller means, a fourth pulley means is fixedly mounted on said power offset drive shaft and a second endless, flexible power transfer means operatively connects said third and said fourth pulley means, said second and said fourth pulley means being driven in the same direction by said power offset drive shaft and said first and second power transfer means being connected to their respective pulley means to drive said forward-drive friction roller means and said reverse-drive friction roller means in opposite directions.

11. A mower in accordance with claim 10 wherein the forward-drive engaging means includes a spring means normally urging the forward-drive friction roller means into frictional engagement with the pair of driven transport wheels and the forward-drive control means is engageable with the support means to hold said forward-drive friction roller means out of contact with said pair of driven transport wheels.

12. A mower in accordance with claim 11 wherein the reverse-drive engaging means is engageable with the support means to first overcome the tension of the spring means and pivot the forward-drive friction roller means out of contact with the pair of driven transport wheels and to a non-driving position and, thereafter, to pivot the reverse-drive friction roller means into frictional engagement with said pair of driven transport wheels.

13. A mower in accordance with claim 12 wherein the reverse-drive engaging means includes a mower operating handle pivotally mounted on the body means.

14. A mower in accordance with claim 12 wherein the reverse-drive control means normally and automatically holds the support means in a non-driving position with the reverse-drive friction roller means out of frictional engagement with the pair of driven transport wheels.

15. A mower in accordance with claim 14 wherein the forward-drive control means must be disengaged from the support means before the reverse-drive control means can be disengaged from the support means.

16. A mower according to claim 7 wherein said front transport wheels are mounted so as to pivot about a vertical axis.

17. In a lawn mower having body means, front and rear transport wheels operatively mounted on said body means, cutter means operatively mounted on said body means, offset drive means operatively mounted on said body means, motor means operatively coupled to said offset drive means and cutter means to drive said offset drive means and cutter means, forward-drive friction roller means operatively coupled to said motor means by said offset drive means and driven by said motor means and pivotally mounted on said body means to pivot into frictional engagement with both rear transport wheel means and drive said mower in a forward direction; forward-drive control means operatively engageable with said forward-drive friction roller means to hold said forward-drive friction roller means out of frictional engagement with said rear transport wheels, forward-drive engaging means to pivot said forward-drive friction means into frictional engagement with said rear transport wheels, the improvement comprising, a reverse propulsion conversion system for propelling said mower in a reverse direction, including; reverse-drive friction roller means operatively coupled to said motor means by said offset drive means and driven by said motor means and pivotally mounted on said body means to pivot into frictional engagement with said rear transport wheels and drive said mower in a reverse direction; reverse-drive control means operatively engageable with said reverse-drive friction roller means to hold said reverse-drive friction roller means to hold said reverse-drive friction roller means out of frictional engagement with said driven transport wheel; and reverse-drive engaging means to pivot said reverse-drive friction roller means into frictional engagement with said rear transport wheels, wherein the forward-drive friction roller means and the reverse drive friction roller means are driven at the same speed by the motor means and the forward-drive friction roller means has a friction roller larger than a corresponding friction roller of the reverse-drive friction roller means to drive said mower in a forward direction faster than it is driven in a reverse direction.

18. A mower in accordance with claim 17 wherein the driven transport wheel means is a pair of rear transport wheels and the forward-drive friction roller means and the reverse-drive friction roller means are frictionally engageable with said pair of rear transport wheels and at least one front transport wheel is freely pivotable on a substantially vertical axis.

19. A mower in accordance with claim 18 wherein a pair of front transport wheels are freely pivotable on substantially vertical axes.

20. A mower in accordance with claim 17 wherein the reverse-drive engaging means includes a mower in operating handle means pivotally mounted on the body means to pivot into engagement with the reverse-drive friction roller means and pivot said reverse-drive friction roller means into frictional engagement with the driven transport wheel.

21. A mower in accordance with claim 20 wherein the forward-drive engaging means includes a spring means normally urging the forward-drive friction roller means into frictional engagement with the driven transport wheel, said forward-drive friction roller means and the reverse-drive friction roller means are coupled together to pivot together and form a drive assembly and the operating handle means is pivotable in one direction into engagement with said drive assembly to first overcome the tension of said spring means and pivot said forward-drive friction roller means out of contact with said driven transport wheel and to a non-driving position and, thereafter, to pivot said reverse-drive friction roller means into engagement with said driven transport wheel. The flexibility of the driving belts assures quick and smooth operation.

22. A mower according to claim 17 wherein said front transport wheels are mounted so as to pivot about a vertical axis.

23. In a lawn mower having body means, front and rear transport wheels operatively mounted on said body means, cutter means operatively mounted on said body means, offset drive means operatively mounted on said body means, motor means operatively coupled to said offset drive means and cutter means to drive said offset drive means and cutter means, forward-drive friction roller means operatively coupled to said motor means by said offset drive means and driven by said motor means and pivotally mounted on said body means to pivot the frictional engagement with both rear transport wheel means and drive said mower in a forward direction; forward-drive control means operatively engageable with said forward-drive friction roller means to hold said forward-drive friction roller means out of frictional engagement with said rear transport wheels, forward-drive engaging means to pivot said forward-drive friction roller means into frictional engagement with said rear transport wheels, the improvement comprising, a reverse propulsion conversion system for propelling said mower in a reverse direction, including; reverse-drive friction roller means operatively coupled to said motor means by said offset drive means and driven by said motor means and pivotally mounted on said body means to pivot into frictional engagement with said rear transport wheels and drive said mower in a reverse direction; reverse-drive control means operatively engageable with said reverse-drive friction roller means to hold said reverse-drive friction roller means to hold said reverse-drive friction roller means out of frictional engagement with said driven transport wheel; and reverse-drive engaging means to pivot said reverse-drive friction roller means into frictional engagement with said rear transport wheels, said forward-drive friction roller means and the reverse-drive friction roller means being coupled together to pivot together and form a drive assembly.

24. A mower in accordance with claim 23 wherein the drive assembly is pivotally mounted on the body means and the forward-drive friction roller means and the reverse-drive friction roller means are mounted on separate sides of the pivot axis of said drive assembly.

25. A mower in accordance with claim 24 wherein the driven transport wheel includes a pair of driven transport wheels mounted on either side of the body means, the drive assembly includes a support means extending across said body means between said pair of wheels and each of the forward-drive friction roller means, the reverse-drive friction roller means comprises a driven shaft rotatably mounted in said support means and a pair of friction rollers fixedly mounted on the ends of said driven shaft to contact said pair of driven transport wheels, and the offset drive means comprises an offset drive shaft.

26. A mower in accordance with claim 25 wherein a first pulley means is fixedly mounted at an intermediate point along the length of the driven shaft of the forward-drive friction roller means, a second pulley means is fixedly mounted on said offset drive shaft, a first endless, flexible power transfer means operatively connects said first and said second pulley means, a third pulley means is fixedly mounted at an intermediate point along the length of the driven shaft of the reverse-drive friction roller means, a fourth pulley means is fixedly mounted on said offset drive shaft and a second endless, flexible power transfer means operatively connects said third and said fourth pulley means, said second and said fourth pulley means being driven in the same direction by said cutter drive shaft and said first and said second power transfer means being connected to their respective pulley means to drive said forward-drive friction roller means and said reverse-drive friction roller means in opposite directions.

27. A mower in accordance with claim 26 wherein the forward-drive engaging means includes a spring means normally urging the forward-drive friction roller means into frictional engagement with the pair of driven transport wheels and the forward-drive control means is engageable with the support means to hold said forward-drive friction roller means out of contact with said pair of driven transport wheels.

28. A mower in accordance with claim 27 wherein the reverse-drive engaging means is engageable with the support means to frst overcome the tension of the spring means and pivot the forward-drive friction roller means out of contact with the pair of driven transport wheels and to a non-driving position and, thereafter, to pivot the reverse-drive friction roller means into frictional engagement with said pair of driven transport wheels.

29. A mower in accordance with claim 28 wherein the reverse-drive engaging means includes a mower operating handle pivotally mounted on the body means.

30. A mower in accordance with claim 28 wherein the reverse-drive control means normally and automatically holds the support means in a non-driving position with the reverse-drive friction roller means out of frictional engagement with the pair of driven transport wheels.

31. A mower in accordance with claim 30 wherein the forward-drive control means must be disengaged from the support means before the reverse-drive control means can be disengaged from the support means.

32. A mower according to claim 23 wherein said front transport wheels are mounted so as to pivot about a vertical axis.

* * * * *